July 4, 1950  D. R. ANDREWS  2,513,702
MULTIPLE BLADE LIGHT INTERRUPTING SHUTTER
Filed Sept. 28, 1948  3 Sheets-Sheet 1

INVENTOR.
Dallas R. Andrews
BY *Chl R Gorham*
ATTORNEY.

July 4, 1950  D. R. ANDREWS  2,513,702
MULTIPLE BLADE LIGHT INTERRUPTING SHUTTER
Filed Sept. 28, 1948  3 Sheets-Sheet 2

INVENTOR.
Dallas R. Andrews
BY
ATTORNEY.

July 4, 1950      D. R. ANDREWS      2,513,702
MULTIPLE BLADE LIGHT INTERRUPTING SHUTTER Filed Sept. 28, 1948      3 Sheets—Sheet 3

INVENTOR.
Dallas R. Andrews
BY
ATTORNEY.

Patented July 4, 1950

2,513,702

UNITED STATES PATENT OFFICE 2,513,702

MULTIPLE BLADE LIGHT INTERRUPTING SHUTTER

Dallas R. Andrews, Collingswood, N. J., assignor to Radio Corporation of America, a corporation of Delaware Application September 28, 1948, Serial No. 51,568

8 Claims. (Cl. 88—19.4)

This invention relates to light interruption shutters for motion picture projectors, and particularly for sixteen millimeter film projectors adapted to operate at both silent and sound film speeds; namely, at sixteen frames per second, and at twenty-four frames per second, respectively.

In the projection of motion pictures, two factors are important, such as (1) maximum, uniform brightness on the observing screen, and (2) elimination of light flicker. Since silent film is projected at the rate of sixteen frames per second, a three-blade shutter is generally used so that the machine will not produce a flicker frequency of less than the established minimum of forty-eight cycles per second. However, with respect to maximum illumination of the screen, a three-blade shutter is not as efficient as a two-blade shutter. Now, since sound film is projected at the rate of twenty-four frames per second, a two-blade shutter may be used to obtain maximum screen brightness and still provide a flicker frequency of not less than forty-eight cycles per second. If a three-blade shutter is used at sound film speed, the amount of time that light can pass to the screen will be approximately two-thirds of the time that light can pass through a two-blade shutter. This approximate ratio is true for a shutter with blades having a nominal width of substantially seventy-two-and-one-half degrees.

The present invention is directed to a shutter mechanism which will automatically shift from a three-blade shutter form to a two-blade shutter form when the rotation thereof is advanced from 960 revolutions per minute, or silent film speed, to 1440 revolutions per minute, or sound film speed and vice versa. Thus, maximum efficiency is obtained at both speeds with standard flicker frequency, and, although slightly less brightness at silent speed is obtained, this is not regarded as serious, since most of the films projected for large audiences have sound.

The invention is made to occupy a small space, all moving parts are under spring tension in both running positions to eliminate noise and rattle, and one form of the shutter remains in full static balance in both operating positions. A shutter mechanism of this type, in which a radially movable weight is employed for shifting the shutter blades, is disclosed and claimed in co-pending application, Ser. No. 46,668, filed August 28, 1948. The present invention is directed to a shutter mechanism in which no shifting weight is employed, but only the change in centrifugal force to transform the mechanism from a three to a two-blade form and vice versa, or in which auxiliary balancing weights are employed to independently react to the change in centrifugal force.

The principal object of the invention, therefore, is to facilitate the projection of motion pictures, particularly when the same projector is used for both silent and sound films.

Another object of the invention is to provide an improved motion picture shutter which automatically shifts from a three to a two-blade form and vice versa, with the change in the rate of picture projection.

A further object of the invention is to provide an improved motion picture shutter which will automatically shift blade positions, which occupies a small space, which provides balanced or substantially balanced operation in all positions, and which provides the established minimum flicker frequency at both speeds of operation.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
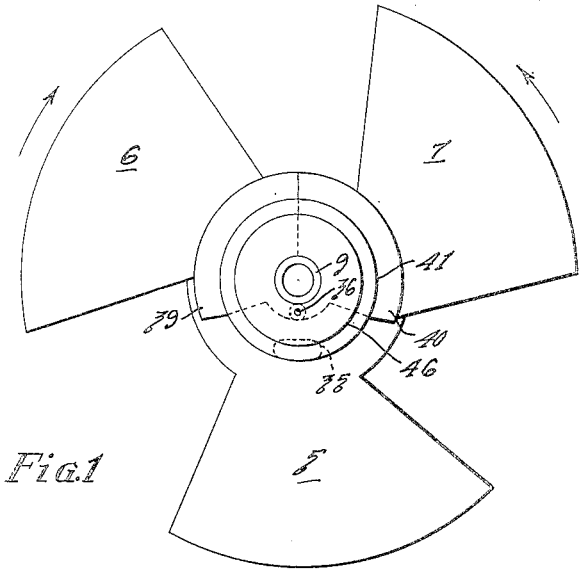
Fig. 1 is a front, elevational view showing one modification of the shutter mechanism in three-blade position and in which auxiliary balancing weights are employed.

Referring now to the drawings, in which the same numerals identify like elements, and referring particularly to Figs. 1 to 5, inclusive, the shutter of this modification has a cover blade 5 and interrupter blades 6 and 7, the blades 6 and 7 being pivotable about axes separated from the axis of a shaft 9, about which the blades are rotatable. The shaft 9, on which the blades are mounted, has a collar 11 and three threaded holes, two of which are shown at 12.

Figure 3:
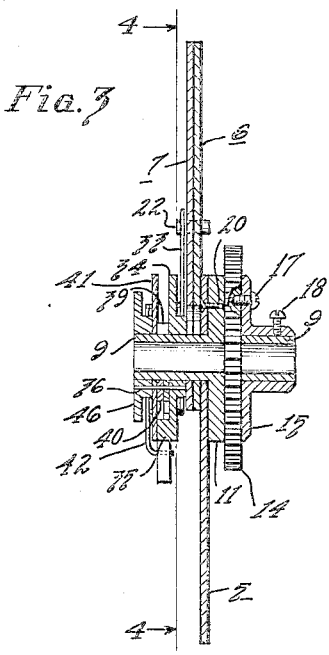
Fig. 3 is a side view, partially in cross-section, and taken along the line 3—3 of Fig. 2.
Figure 5:
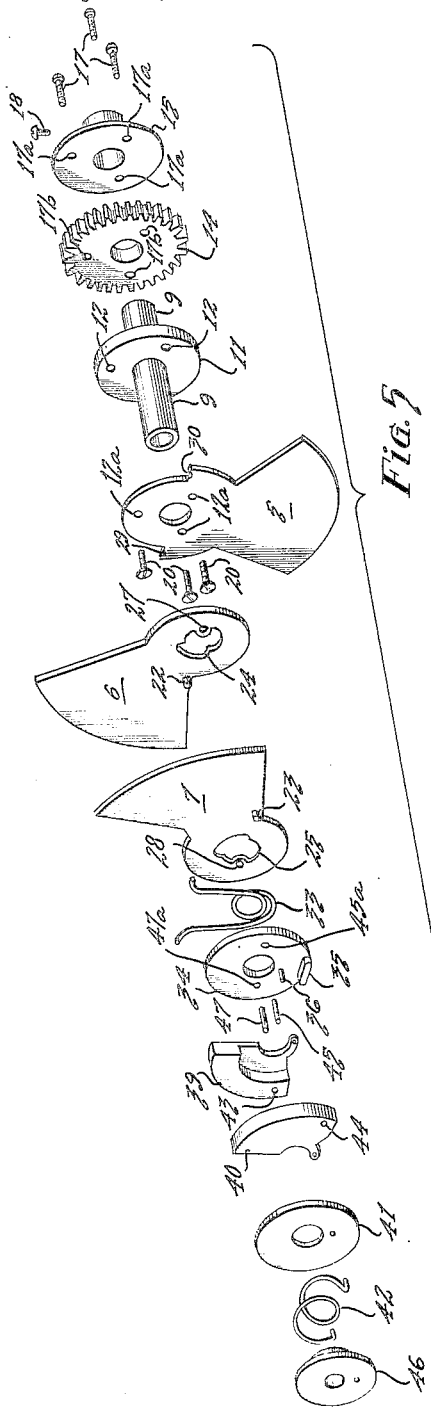
Fig. 5 is an exploded view of the modification of the shutter shown in Figs. 1 to 4, inclusive.
Figure 9:
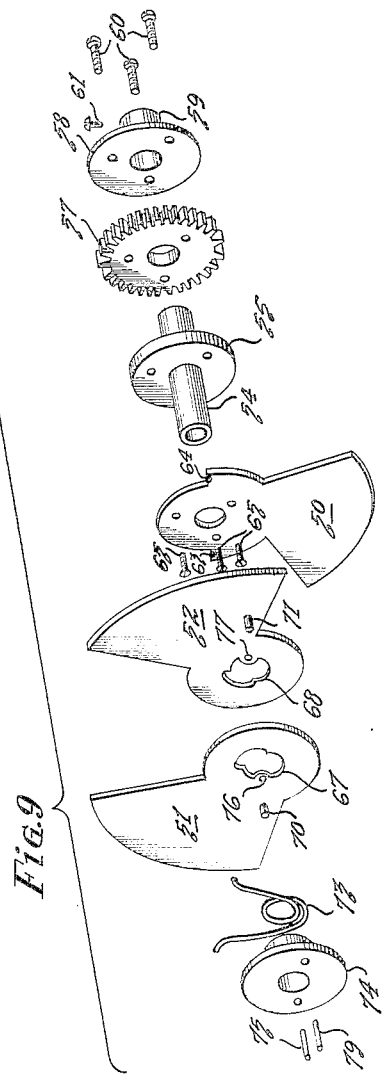
Fig. 9 is an exploded view of the shutter modification shown in Figs. 6, 7, and 8.
Figure 6:
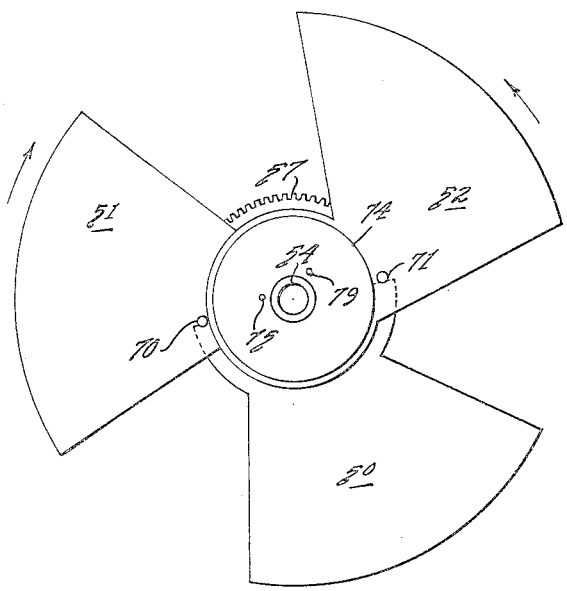
Fig. 6 is a front, elevational view of another modification of the shutter mechanism in three-blade position.
Figure 8:
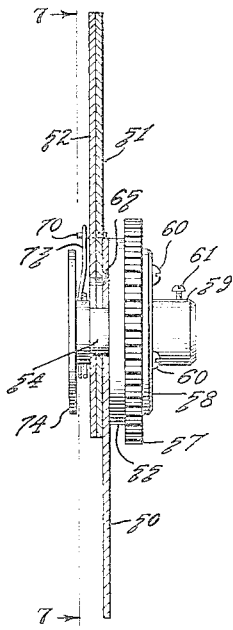
Fig. 8 is a side view, partly in cross-section, taken along the line 8—8 of Fig. 7.

Referring particularly to Figs. 3 and 5, the drive gear 14 for the shutter is mounted on the right-hand end of the shaft 9 against collar 11 and which is backed by a flanged sleeve 15, the flange being attached to the gear 14 by means of screws 17 threaded through holes 17a in flanged sleeve 15 and holes 17b in the gear 14. The sleeve is fixedly attached to the right-hand end of shaft 9 by a set screw 18.

Figure 2:
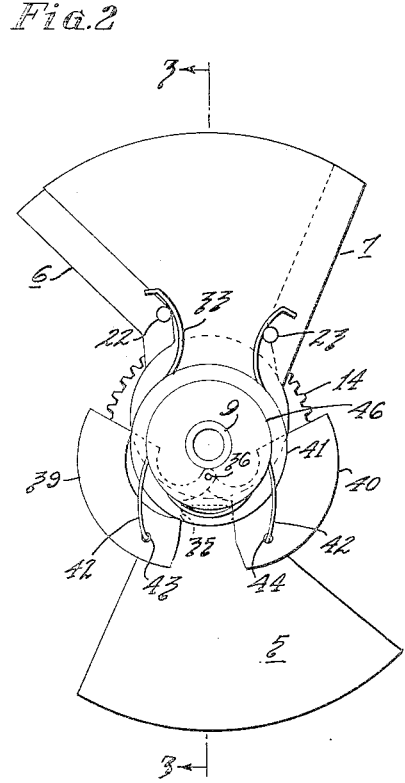
Fig. 2 is a front, elevational view of the same shutter mechanism of Fig. 1 in two-blade position.
Figure 4:
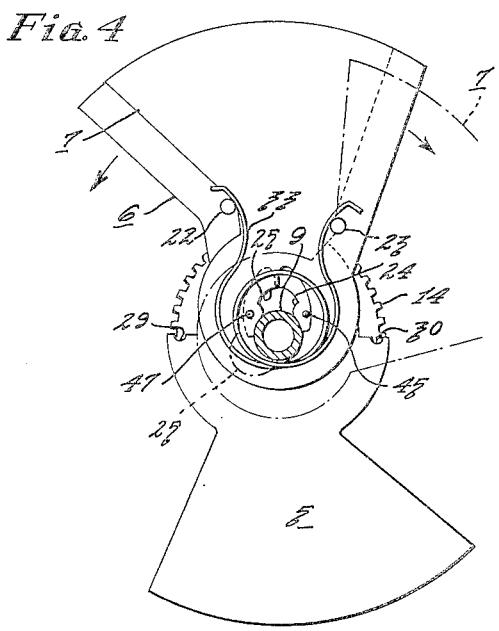
Fig. 4 is a front, elevational view taken along the line 4—4 of Fig. 3.

The cover blade 5 is mounted on the left-hand portion of the shaft 9 and attached by screws 20 (see Figs. 3 and 5) which enter holes 12 in collar 11 and holes 12a in cover blade 5. The next element on the shaft is the interrupter blade 6 having a pin 22 extending on both sides of the blade, and then blade 7 having a pin 23 extending on both sides thereof. It will be noted that the blades 6 and 7 have slots or openings 24 and 25 which are not circular, as provided for blade 5, but are irregularly elongated. These slots permit the blades 6 and 7 to rotate on axes provided by pins 45 and 47, respectively, passing through holes 27 and 28, and mounted in holes 45a and 47a in weight mount 34, so that when the blades 6 and 7 are rotated to overlapping position, such as shown in Figs. 2 and 4, they will spiral about the rotational axis of the shutter mechanism. Thus, only centrifugal force acting on the blades themselves will cause them to overlap. The pins 22 and 23 determine the position of the blades 6 and 7 when the shutter operates with three blades, since pin 22 limits blade 6 by abutting a notch 29 in cover blade 5, and pin 23 limits blade 7 by abutting notch 30 in the cover blade 5. The same pins position the blades in overlapping position when pin 22 abuts blade 7 and pin 23 abuts blade 6.

To hold the blades 6 and 7 in three-blade position at a predetermined speed of rotation of the shutter shaft 9, a spring 33 is employed, this spring being wrapped around the shaft 9 and having its ends against pins 22 and 23. (See Fig. 4.) The next element along the shaft 9 is a weight mount 34 having a spacer and limiting stop 35. Immediately below the shaft opening in the mount 34 is a pin 36 on which is pivoted the weight members 39 and 40 so that these weights will swing on an axis determined by the pin 36 and the amount of their rotation will be determined by the width of the spacer 35. A shim washer 41 is then placed against weight 40, after which a spring 42 is placed on the shaft 9, the ends of the spring being placed in holes 43 and 44 in the weights 39 and 40. Thus, the spring 42 places the weight members under tension to urge them to a position closest to the axis of shaft 9. The next element is a mounting collar 46 placed on the end of shaft 9 and maintains the elements in assembly.

This shutter mechanism varies from those shown in the above-identified application by the fact that the two blades pivot on axes separated from the axis of rotation and may be easily rotated solely by centrifugal force. The blades may be made of aluminum, and all portions of each blade may be in a single plane. Since the blades are rotated on axes separated from the axis of rotation of the shutter, a special type of counterbalance is provided, this counterbalance being weights which are also rotatable on an axis separated from the axis of rotation of the shutter. It will be noted that both the blades 6 and 7 are under spring tension in both operating positions, as well as the weights 39 and 40, so that noise and rattle are avoided at all speeds. Furthermore, by having independent counterbalancing weights, these may be constructed separately and be provided with their own spring tension independently of the shutter blades. By this specific arrangement of weights, their pivot point position and their movement from one side of the rotational axis to the other, the long travel of a single weight is avoided, since the travel of the average center of gravity is increased sufficiently without increasing the radius excessively.

Referring now to Figs. 6, 7, 8, and 9, a shutter mechanism is shown which performs the function of the first modification, and of the shutter mechanisms disclosed and claimed in the above mentioned co-pending application; but, in which no counterbalance is employed. By eliminating the counterbalance, the space required for the shutter is reduced to a minimum, and the particular type of construction provides a balance of the shutter in the high speed position and a substantial balance in the low speed position. This is obtained not only by constructing the movable blades of light-weight material, such as magnesium, but by the position of the pivot points of the interrupter blades. These pivot points are similar to those of the first described modification; that is, at points separated from the axis of rotation of the shutter. In a shutter of this type, the unbalance was substantially zero in the two-blade position and approximately 0.17 ounce-inch in the three-blade position. Since the speed of rotation is much lower when the shutter is operating in the three-blade position, it was found that the vibration was negligible and no picture "jump" could be detected on the screen.

Referring now to the shutter construction in detail, the cover blade 50 has interrupter blades 51 and 52. These blades are mounted on a shaft 54, similarly to the shaft 9 of the first modification, the shaft having a mounting collar 55. Mounted on the shaft 54 to the right of collar 55 is a drive gear 57 and a flanged sleeve 58, which are attached by screws 60, the sleeve 59 being held on the shaft 54 by a set screw 61. The cover blade 50 has a pair of notches 63 and 64 similar to notches 29 and 30 of the cover blade 50, and a plurality of holes through which pass screws 65 for fastening the cover blade to the collar 55 (see Figs. 8 and 9). The interrupter blades 51 and 52 are similar to the blades 6 and 7 shown in Fig. 5, these blades having the elongated center openings 67 and 68 and stop pins 70 and 71 which extend on both sides of the blades. The right-hand ends of the pins limit the shutter to its three-blade position when they abut notches 63 and 64. The left-hand portion of pin 71 controls the overlapping position of the blades when it abuts the right-hand edge of the blade 51.

Figure 7:
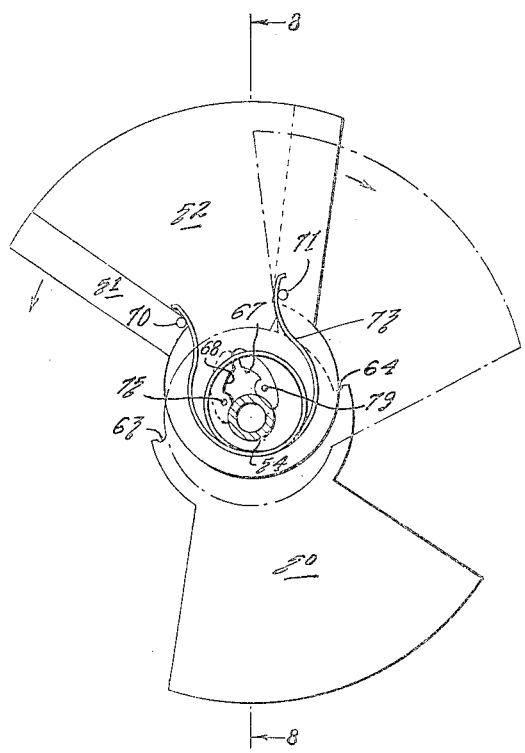
Fig. 7 is a front, elevational view of the shutter of Fig. 1 in two-blade position.

The next element of the shutter is a wire spring 73 which is wound on the shaft 54, the ends of which abut the left-hand ends of pins 70 and 71. A mounting flange 74 is then positioned on the shaft to complete the assembly. The pivotal axes of blades 51 and 52 are about pins 75 and 79 positioned in holes 76 and 77, respectively.

so that when these blades overlap, as shown in Fig. 7, they move along openings 67 and 68 and may be easily moved to overlapping position against the tension of spring 73. The blades are thus allowed a small amount of radial motion, which causes one blade to spiral clockwise and the other blade to spiral counterclockwise when the speed of the shutter is increased from 960 to 1440 revolutions per minute. These pivot points are selected so that the shift in moment of leverage will provide a positive lock-in feature at either speed. Since the blades are wider at the outer end than near the center and the motion of each movable blade has a radial component, they will form an effective blade which is smaller than the cover blade at a given radius, if allowed to completely overlap. However, the stop pins 70 and 71 are so placed that, when the blades overlap, the effective blade and the fixed blade are symmetrical; that is, identical in shape and 180° apart. To provide this symmetry, one of the edges of each movable blade, when in the correct mean position, makes an angle of about 3° with the line that would be assumed by the edge of a blade of exactly the shape of the fixed blade, but displaced 120° therefrom. However, the time that each spot of light is blacked out is the same with all three blades, and, therefore, no ill effects are detectable from this variation.

There is thus provided a final shutter mechanism which is capable of automatically shifting from a two-blade to a three-blade type of shutter when the speed is decreased, and to automatically transform itself from a three-blade shutter to a two-blade shutter when the speed is increased, the mechanism being operable within the vibration limits without the use of counterbalancing weights. If higher rotational speeds are desired, in which the amount of unbalance is too great, the first described modification may be used wherein a perfect balance at all speeds is obtained.

I claim:

1. A shutter mechanism comprising a shaft, three blades on said shaft, one of said blades being fixedly attached to said shaft, means for separately and individually pivoting each of said other blades at points separated from the axis of said shaft and from each other and on axes parallel with the axis of said shaft, said two other blades being rotatable on said pivot points between a position 120° apart and an overlapping position, said shutter mechanism being in balance when said other two blades are in overlapping position and in a position 120° apart, and tensioning means between and contacting said shaft and said two blades for urging said blades to their position 120° apart.

2. A shutter mechanism in accordance with claim 1, in which a pair of weights are provided, means for pivoting said weights on a common point separated from the axis of said shaft, and additional tensioning means for urging said weights toward the axis of said shaft.

3. A shutter mechanism for interrupting a light beam comprising a rotatable shaft adapted to be driven at two predetermined speeds of rotation, three blades mounted on said shaft and rotatable thereby, means for fixedly attaching one of said blades to said shaft, means for pivoting said other two blades on separate axes parallel with the axis of said shaft and separated therefrom, said other two blades being of relatively light-weight material, and tensioning means attached to said two blades for urging said blades in opposite directions, said two blades pivoting on their axes to overlapping position at one of said predetermined speeds and balancing said fixed blade, and being separated by said tensioning means to positions 120° apart at said other predetermined speed and substantially balancing said fixed blade.

4. A shutter mechanism for interrupting a light beam comprising a rotatable shaft adapted to be driven at two predetermined speeds of rotation, three blades mounted on said shaft and rotatable thereby, means for fixedly attaching one of said blades to said shaft, means for pivoting said other two blades on separate axes parallel with the axis of said shaft and separated therefrom, tensioning means attached to said two blades for urging said blades in opposite directions, said two blades pivoting on their axes to overlapping position at one of said predetermined speeds and being separated by said tensioning means to positions 120° apart at said other predetermined speed, a pair of weights rotatable by said shaft, said weights being pivoted on an axis parallel with and separated from the axis of said shaft, and additional tensioning means are provided for urging said weights toward the axis of said shaft and for maintaining said weights at a position adjacent the axis of said shaft at one predetermined speed of rotation of said shaft, said weights being moved to a position a greater distance from the axis of said shaft by centrifugal force at said other speed of rotation of said shaft.

5. A shutter mechanism for interrupting a light beam comprising a rotatable shaft adapted to be driven at two predetermined speeds of rotation, three blades mounted on said shaft and rotatable thereby, means for fixedly attaching one of said blades to said shaft, individual pivot means for each of said other blades, said pivot means being parallel with and separated from the axis of said shaft, a wire spring between and contacting said shaft and said pivoted blades for urging said pivoted blades apart and maintaining said blades at positions substantially 120° apart at one predetermined speed of rotation of said shaft, and means on said pivoted blades cooperating with said fixedly mounted blade for determining said 120° position, said means also determining the position of said blades in an overlapping position, said blades being moved against said tensioning means to overlapping position by centrifugal force at said other predetermined speed of rotation of said shaft.

6. A shutter mechanism is accordance with claim 5, in which there are provided a pair of balancing weights, said weights being in the form of quadrates and positioned on either side of said shaft, common pivot means for each of said weights, and a spring for holding said weights in a position closest to the axis of said shaft at the lower predetermined speed of said shaft, said tensioning means permitting said weights to move away from the axis of said shaft at the higher predetermined speed of rotation of said shaft.

7. A shutter mechanism in accordance with claim 5, in which said fixedly attached blade is balanced against said pivoted blades when said pivoted blades are in overlapping position, and the unbalance of said mechanism is approximately 0.17 ounce-inches when said pivoted blades are positioned 120° apart.

8. A shutter mechanism in accordance with claim 5, in which are provided a pair of balancing weights, said weights being pivoted on an axis separated from the axis of rotation of said mechanism, each of said weights moving from one side of said axis to the other during changes from one of said speeds to the other of said speeds.

DALLAS R. ANDREWS.

REFERENCES CITED

The following references are of record in the file of this patent:

UNITED STATES PATENTS

| Number | Name | Date |
| --- | --- | --- |
| 905,910 | Naylor | Dec. 8, 1908 |
| 1,700,513 | Porter | Jan. 29, 1929 |
| 1,900,919 | Dina | Mar. 14, 1933 |
| 1,965,366 | Brown | July 3, 1934 |
| 2,349,500 | Howell | May 23, 1944 |